United States Patent
Park

(10) Patent No.: US 7,019,874 B2
(45) Date of Patent: Mar. 28, 2006

(54) HOLOGRAPHIC MEMORY SYSTEM INCLUDING A PHOTODETECTING DEVICE PROVIDED WITH A BAND-PASS FILTER

(75) Inventor: Joo-Youn Park, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 0 days.

(21) Appl. No.: 10/849,224

(22) Filed: May 20, 2004

(65) Prior Publication Data
US 2004/0240011 A1 Dec. 2, 2004

(30) Foreign Application Priority Data
May 31, 2003 (KR) ...................... 10-2003-0035036

(51) Int. Cl.
*G03H 1/00* (2006.01)
(52) U.S. Cl. .............................. 359/30; 359/32; 359/7; 369/103; 369/120
(58) Field of Classification Search .................... 359/1, 359/3, 7, 29, 30, 32; 369/103, 120, 122
See application file for complete search history.

(56) References Cited

U.S. PATENT DOCUMENTS

| | | | | |
|---|---|---|---|---|
| 5,383,038 A | * | 1/1995 | Lawandy | ..................... 359/7 |
| 5,684,611 A | * | 11/1997 | Rakuljic et al. | ............... 359/7 |
| 5,969,323 A | | 10/1999 | Gurevich et al. | |
| 6,373,806 B1 | * | 4/2002 | Kitamura et al. | ........... 369/103 |
| 6,614,730 B1 | * | 9/2003 | Vo-Dinh | ................. 369/13.01 |

FOREIGN PATENT DOCUMENTS

| | | |
|---|---|---|
| WO | 94/14090 | 6/1994 |
| WO | 99/12286 | 3/1999 |

OTHER PUBLICATIONS

J. Ashley et. al.; *Holographic data storage*; IBM Journal of Research and Development, vol. 44, No. 3, May 2000, XP-001032041; pp. 341-368.
Demetri Psaltis et. al.; *Holographic Data Storage*; IEEE, vol. 31, No. 2, Feb. 1998, XP-000737938; pp. 52-60.
Demetri Psaltis et. al.; *Holographic 3d Disks*; ICECS 1996; pp. 562-565.

* cited by examiner

Primary Examiner—Fayez G. Assaf
(74) Attorney, Agent, or Firm—Bacon & Thomas, PLLC

(57) ABSTRACT

A holographic memory system includes a light source for generating a reference beam having a wavelength; and a photodetecting device for selectively detecting a reconstructed signal beam corresponding to the reference beam. The photodetecting device includes a band-pass filter for transmitting light of a wavelength band including the wavelength of the reconstructed signal beam while blocking light having a wavelength deviating from the wavelength band; and a photodetecting unit for detecting the light transmitted through the band-pass filter.

3 Claims, 3 Drawing Sheets

HOLOGRAPHIC MEMORY SYSTEM INCLUDING A PHOTODETECTING DEVICE PROVIDED WITH A BAND-PASS FILTER

FIELD OF THE INVENTION

The present invention relates to a holographic memory system; and, more particularly, to a holographic memory system including a photodetecting device with a band-pass filter which is capable of substantially blocking a noise beam such as white light from the sun or an illumination device.

BACKGROUND OF THE INVENTION

Conventional holographic memory systems normally employ a page-oriented storage approach. An input device such as a spatial light modulator ("SLM") presents recording data in the form of a two dimensional array (referred to as a page), while a photodetector such as a charge coupled device ("CCD") camera or a CMOS detector is used to retrieve the recorded data page upon readout. Other architectures have also been proposed wherein a bit-by-bit approach is employed in lieu of the page-oriented approach.

Referring to FIG. 1, there is illustrated a conventional page-oriented holographic memory system. The conventional page-oriented holographic memory system includes a light source 100; a beam splitter 102; a reflection mirror 104; a first and a second shutter 105 and 106; a SLM 107; a first and a second lens 108 and 110; a photodetector 112; a spindle motor 120; and a holographic storage medium 130. The photodetector 112 is a charge coupled device (CCD) camera or a CMOS detector.

The conventional page-oriented holographic memory system shown in FIG. 1 records or retrieves data in the following way. The light source 100 emits a laser beam. The beam splitter 102 separates the emitted laser beam into a reference beam and a signal beam. The signal beam is transmitted through the beam splitter 102 to be directed toward the holographic storage medium 130 and the reference beam is reflected by the beam splitter 102 be directed toward the reflecting mirror 104. The reference beam is then reflected by the reflection mirror 104 to the holographic storage medium 130 at a predetermined incident angle.

In case of recording data in the holographic storage medium 130, both the first and the second shutter 105 and 106 are opened so that the signal beam can be transferred to the spatial light modulator 107 and the reference beam can be transferred to the holographic storage medium 130. The spatial light modulator 107 modulates the signal beam into binary pixel data on a page basis. The modulated signal beam is transferred to the holographic storage medium 130 via the first lens 108. The holographic storage medium 130 stores data by storing an interference pattern acquired from an interference phenomenon between the reflected reference beam and the modulated signal beam.

On the other hand, in case of retrieving the data recorded in the holographic storage medium 130, only the first shutter 105 is opened so that the reflected reference beam can be transferred to the holographic storage medium 130 while the second shutter 106 is closed. When the reference beam is irradiated onto the medium 130 in order to reconstruct the data recorded thereon, the reference beam is diffracted by the interference pattern in the medium 130 so that a signal beam is reconstructed. The reconstructed signal beam is detected by the photodetector 112 via the second lens 110 and the photodetector 112 converts the reconstructed signal beam to an electric signal.

However, in case the retrieving process is not performed under a complete dark condition, white light from the sun or an illumination device may be introduced into the photodetector during the retrieving process. The white light is a major cause of noise so that a signal to noise (S/N) ratio of the retrieved data is decreased. Therefore, the holographic memory system requires a photodetecting device capable of substantially preventing the white light from being introduced thereinto while detecting the reconstructed signal beam.

SUMMARY OF THE INVENTION

It is, therefore, an object of the present invention to provide a holographic memory system including a photodetecting device capable of selectively detecting a reconstructed signal beam of a predetermined wavelength to enhance a signal to noise (S/N) ratio of the retrieved data.

In accordance with one aspect of the invention, there is provided a holographic memory system including: a light source for generating a reference beam having a wavelength; and a photodetecting device for detecting a reconstructed signal beam corresponding to the reference beam, the photodetecting device selectively detecting light of a wavelength band including a wavelength of the reconstructed signal beam.

The photodetecting device may includes a band-pass filter for transmitting light of the wavelength band including the wavelength of the reconstructed signal beam while blocking light having a wavelength deviating from the wavelength band; and a photodetecting unit for detecting the light transmitted through the band-pass filter.

In accordance with another aspect of the invention, there is provided a photodetecting device for use in a holographic memory system, the photodetecting device including: a band-pass filter for transmitting light of a wavelength band while blocking light having a wavelength deviating from the wavelength band; and a photodetecting unit for detecting the light transmitted through the band-pass filter.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
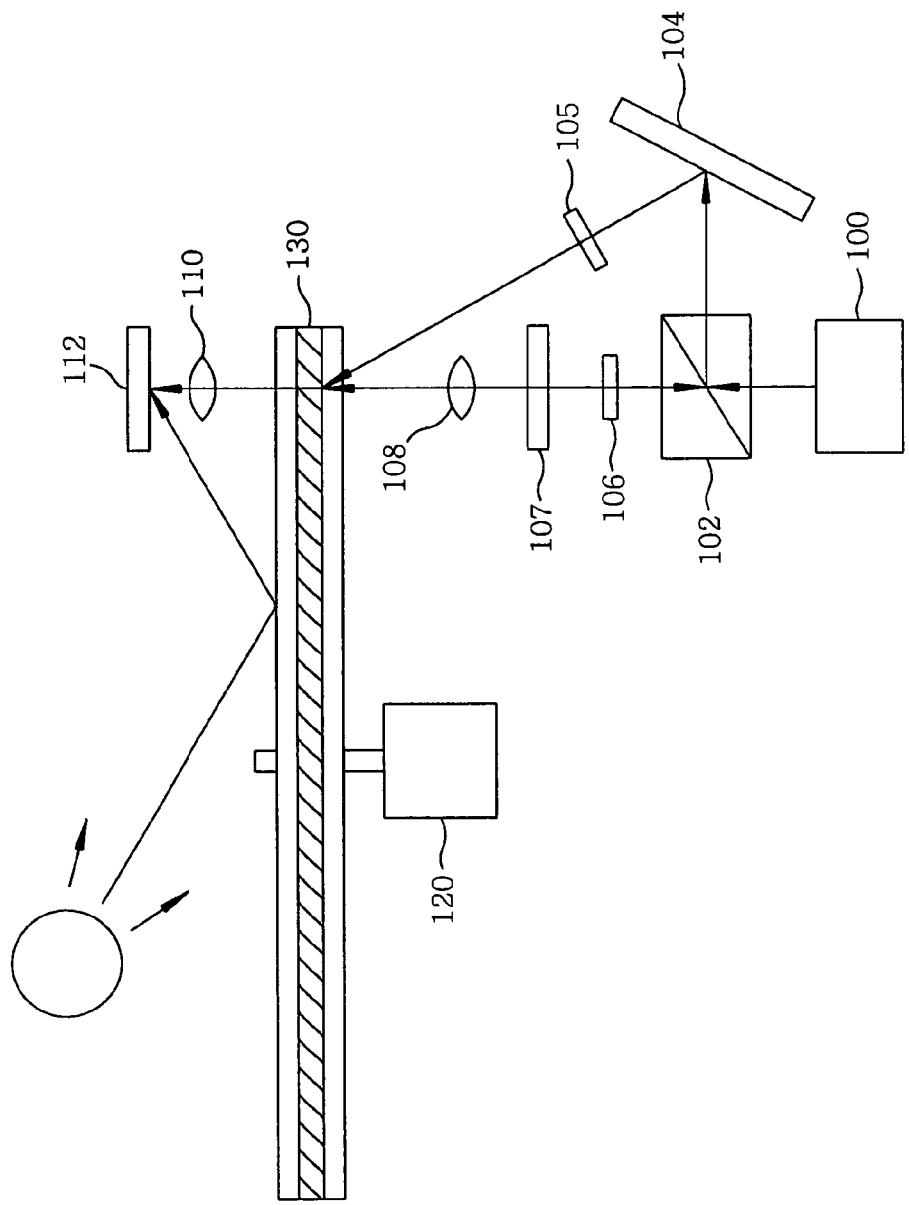
FIG. 1 illustrates a conventional page-oriented holographic memory system.

A preferred embodiment of the present invention will now be described with reference to FIGS. 2 to 4. In the drawings, like reference numerals present like parts.

Figure 2:
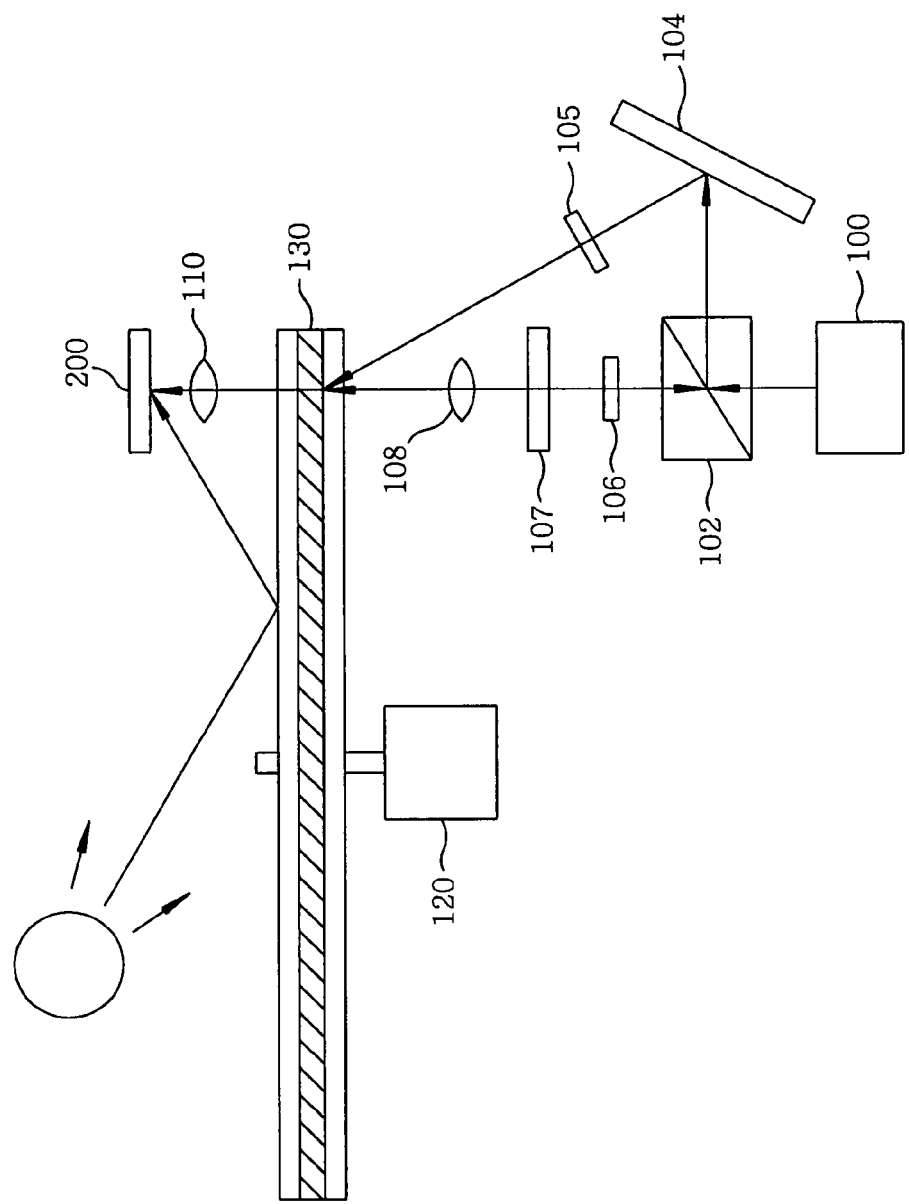
FIG. 2 sets forth a page-oriented holographic memory system in accordance with the present invention.

Referring to FIG. 2, there is illustrated a page-oriented holographic memory system in accordance with the preferred embodiment of the present invention, which is similar to the conventional holographic memory system shown in FIG. 1 except for an improved photodetecting device 200.

Therefore, detailed descriptions on the components identical to those of the conventional holographic memory system will be omitted.

Figure 3:
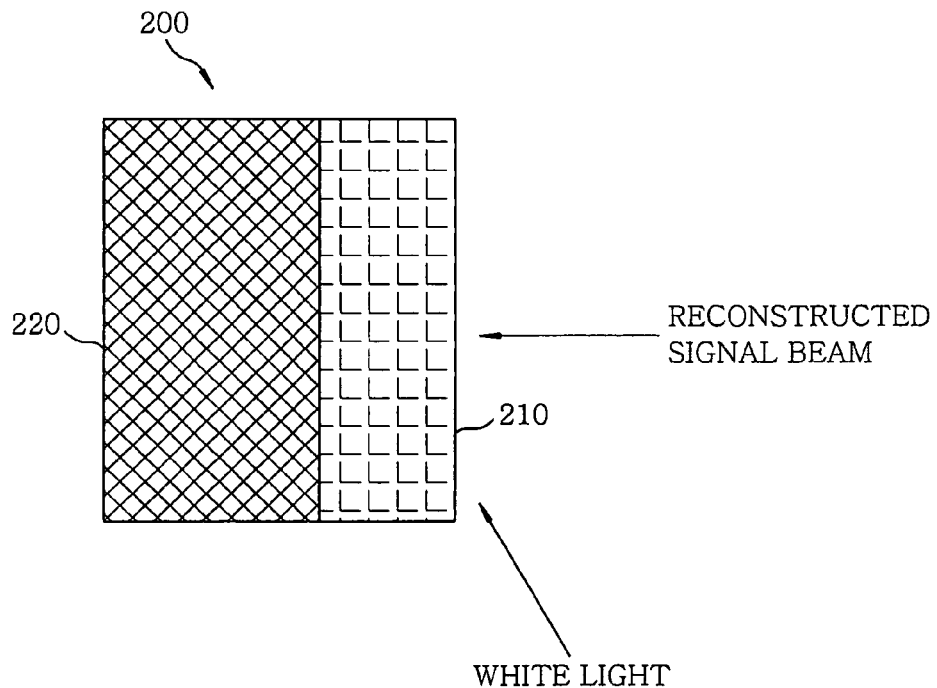
FIG. 3 shows a selective photodetecting device in accordance with the present invention.

Referring to FIG. 3, there is illustrated the photodetecting device 200 of the present invention. The photodetecting device 200 includes a band-pass filter 210 and a photodetecting unit 220. The band-pass filter 210 selectively transmits therethrough light of a predetermined wavelength band while blocking light of other wavelengths. Preferably, the band-pass filter 210 is a laser line band-pass filter.

The photodetecting unit 220, which is, e.g., a CCD camera or a CMOS detector, detects the light of the predetermined wavelength transmitted by the band-pass filter 210 and converts it to an electric signal.

In case of retrieving data recorded in the holographic storage medium 130, a second shutter 106 is closed and only a first shutter 105 is opened so that a reference beam is irradiated onto the medium 130 in order to reconstruct the data recorded thereon. The reference beam is diffracted by an interference pattern in the medium 130 so that a reconstruction signal beam having a predetermined wavelength is generated. The reconstruction signal beam is directed to the photodetecting device 200 via a second lens 110. The band-pass filter 210 of the photodetecting device 200 transmits the signal beam of a predetermined wavelength, e.g., 532 nm, to the photodetecting unit 220 while blocking ambient light having a wavelength deviating from the predetermined wavelength band. The phtodetecting unit 220 converts the reconstructed signal beam to an electric signal.

Preferably, the band-pass filter 210 has a highest transmission intensity for light having a wavelength of 532 nm.

Figure 4:
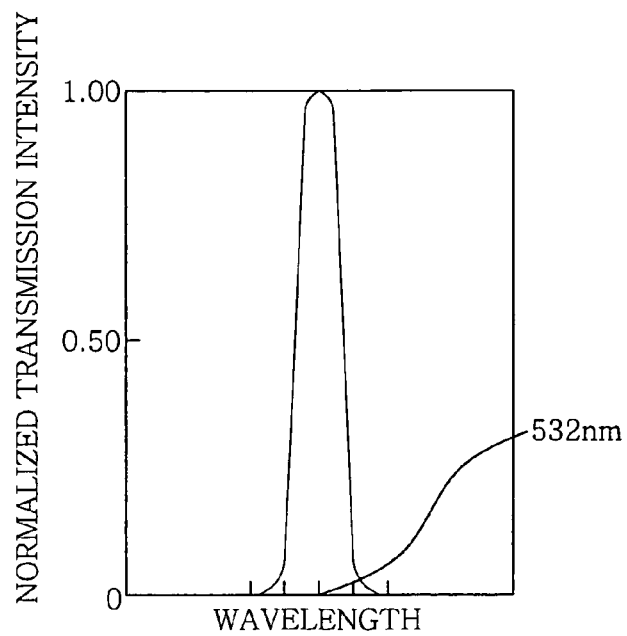
FIG. 4 is a graph showing a relationship between a normalized transmission intensity of a band-pass filter and wavelengths of light.

Referring to FIG. 4, there is provided a graph showing a relationship between a normalized transmission intensity of the band-pass filter 210 and wavelengths of light. As can be seen from FIG. 4, the band-pass filter 210 of the photodetecting device 200 has a property to selectively transmit light of a specific wavelength band centered on 532 nm. That is, in the holographic memory system, the band-pass filter 210 transmits the signal beam of 532 nm wavelength while suppressing ambient light having a wavelength deviating from the above wavelength band. As a result, the reconstructed signal beam of 532 nm wavelength can be detected by the photodetecting unit 220 whereas light having a wavelength deviating from the above band is blocked by the band-pass filter 210. Accordingly, a significantly decreased amount of white light is detected by the phtodetecting unit 220 so that a noise of the reconstructed signal beam is reduced to enhance a signal to noise (S/N) ratio of the retrieved data.

Although the page-oriented holographic memory system has been described in the above embodiment, it is appreciated that the present invention may be applied to a holographic memory system employing a bit-by-bit approach.

While the invention has been shown and described with respect to the preferred embodiments, it will be understood by those skilled in the art that various changes and modifications may be made without departing from the spirit and the scope of the invention as defined in the following claims.

What is claimed is:

1. A holographic memory system comprising:
    a light source for generating a reference beam having a wavelength; and
    a photodetecting device for detecting a reconstructed signal beam corresponding to the reference beam, the photodetecting device selectively detecting light of a wavelength band including a wavelength of the reconstructed signal beam, wherein the photodetecting device includes:
    a band-pass filter for transmitting light of the wavelength band including the wavelength of the reconstructed signal beam while blocking light having a wavelength deviating from the wavelength band; and
    a photodetecting unit for detecting the light transmitted through the band-pass filter.

2. The holographic memory system of claim 1, wherein the band-pass filter is a laser line band-pass filter.

3. The holographic memory system of claim 2, wherein the laser line band-pass filter transmits light having a wavelength of about 532 nm.

* * * * *